UNITED STATES PATENT OFFICE.

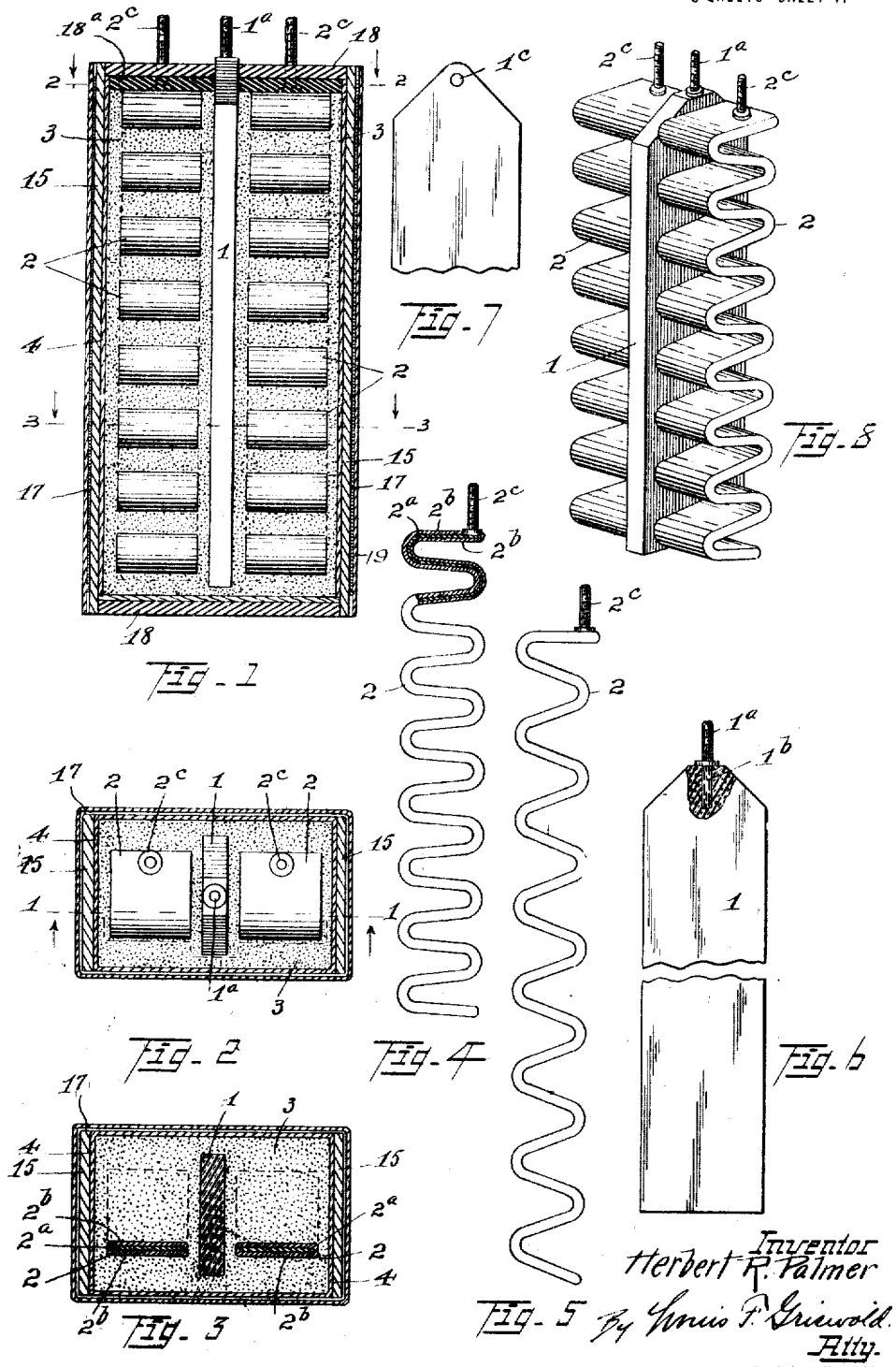

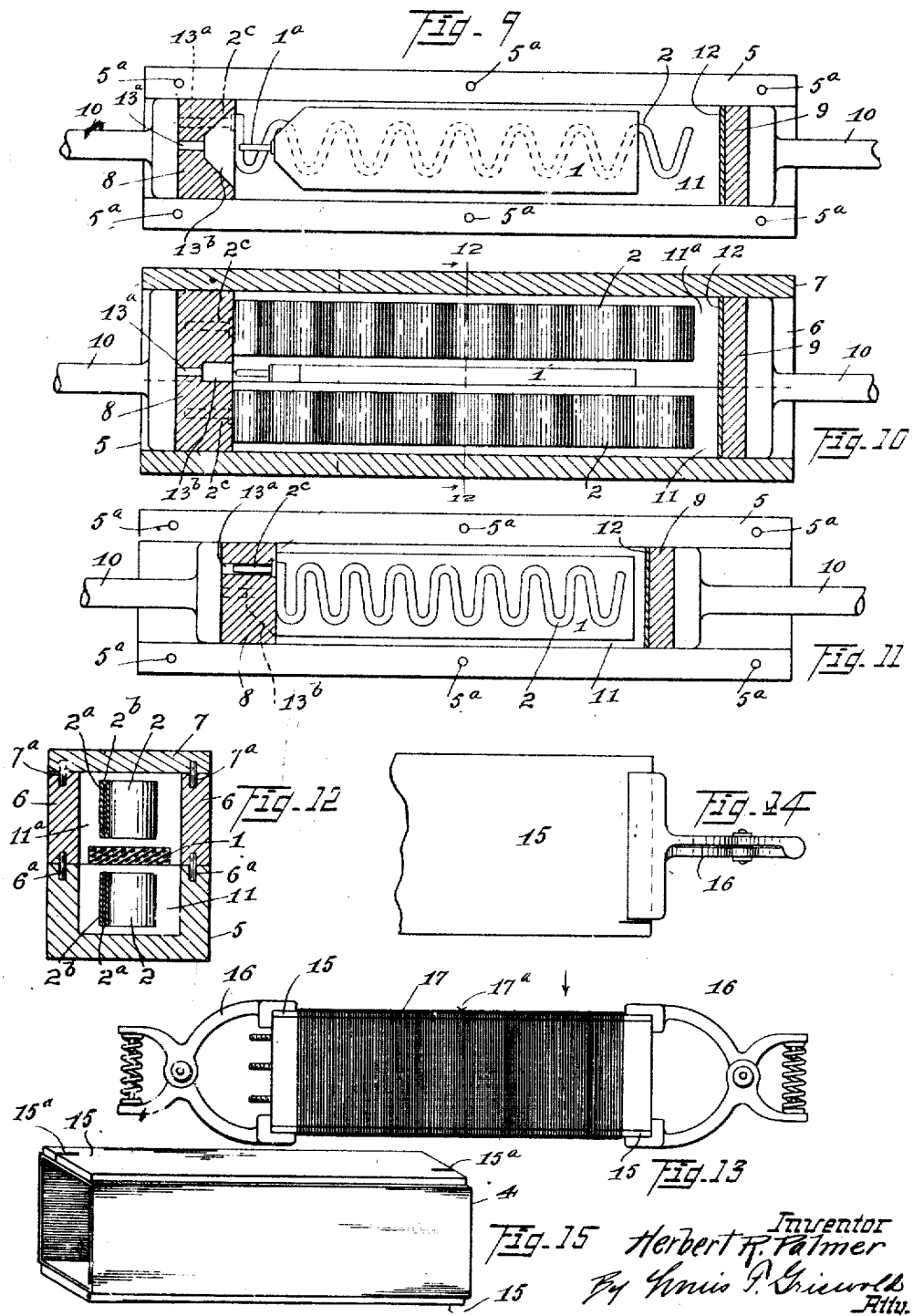

HERBERT R. PALMER, OF CLEVELAND HEIGHTS, OHIO.

DRY-CELL BATTERY AND METHOD OF MAKING SAME.

1,271,933.  Specification of Letters Patent.  Patented July 9, 1918.

Application filed October 16, 1917. Serial No. 196,829.

*To all whom it may concern:*

Be it known that I, HERBERT R. PALMER, a citizen of the United States, residing at Cleveland Heights, in the county of Cuyahoga and State of Ohio, have invented certain new and useful Improvements in Dry-Cell Batteries and Methods of Making Same, of which the following is a specification.

This invention relates particularly to the construction of an improved dry-cell battery of the type in which the life or durability of electric discharge is dependable primarily upon the depolarizing, or hydrogen absorbing action of the manganese dioxid in close contact with a medium which separates the zinc, or active element of the cell from the depolarizing medium.

Inasmuch as the operation and efficiency of the cell is dependent upon the formation, combination and relative arrangement of the elements that enter into it, and as the method of making is the important factor whereby the proper arrangement is brought about, and is peculiar to the construction of the improved cell, it is embodied in the present invention.

As the primary object of the present invention is the same as that of a former invention of mine, for which Letters Patent No. 1,231,057 were issued to me June 26th, 1917, I will here quote a portion of the preamble of said patent.

"It is a fact readily understood by those familiar with the battery art, that the larger the zinc area presented to the $MnO_2$, the less current per area unit is generated, and consequently the less depolarizing load is imposed upon the $MnO_2$ in intimate contact with said area. The proportion of the zinc area to the size of the cell and other elements of the battery, is an important factor in the life and efficiency of the cell. In view of the combination with the other elements the larger the zinc area in proportion to the size of the cell, the longer the life of the cell and the larger the output at any given time, without excessive drain upon the life of the $MnO_2$. In the ordinary type of Leclanché round cell dry battery where the container and active element are one, being a zinc cylindrical casing, the larger the casing, or active element, the longer the life of the cell; therefore in order to increase the life of the cell or to admit of a larger depolarizing load on the $MnO_2$ it is, in the ordinary construction above mentioned, necessary to increase the dimensions of the cell in order to present a greater zinc or active element area to contact the depolarizer or $MnO_2$".

The primary object of the present invention is to increase the efficiency of the cell of the type set forth, without materially increasing the volume or weight of the cell. The said object is realized by the employment of one carbon or positive pole, and the utilization of both sides of two negative poles of peculiar formation and arrangement. The said elements, in combination with the depolarizing element, being so arranged and confined in a cell of a given size so that the life on a given load is increased approximately 300% over the ordinary cell of the same volume and weight.

A further object of the invention is the provision of a construction that embodies two anodes and a single cathode, the said anodes being adapted for connection and combined operation, resulting in extremely high efficiency. Or one anode may be in active service while the other is disconnected and held in reserve thereby prolonging the life of the cell by providing a duplex cell having a single cathode.

As before stated, the realization of the above objects is dependable upon perfection of construction and arrangement of elements: Therefore a further object of the invention is the provision of a method or means whereby the elements that coöperate in bringing about the desired results, may be uniformly, accurately, and economically assembled, a method particularly applicable to the novel construction of the cell.

With these objects in view, the invention consists in the construction, combination and arrangement of elements that form the cell, and in the method of producing said cell as hereinafter described, and pointed out definitely in the claims, reference being had to the accompanying drawings which are made a part of the specification, similar characters of reference being employed to designate corresponding parts throughout the description and in the drawings.

In the said drawings Figure 1 is a vertical section of the improved cell, substantially on line 1—1 of Fig. 2.

Fig. 2 is a cross-section through the cell on line 2—2 of Fig. 1, showing the carbon member and binding posts not sectioned.

Fig. 3 is a cross-section on line 3—3 of Fig. 1.

Fig. 4 is a side view of one of the anodes detached, showing a portion in section, and illustrating the member compressed, as will be explained.

Fig. 5 is a side view of one of the anodes before assembling.

Fig. 6 is a side view of the carbon, or cathode member, with a portion in section, and Fig. 7 is a fragmentary view of a modification of the said member.

Fig. 8 is a perspective view, illustrative of the relative arrangements of the anodes to the cathode, all the other elements being eliminated.

Fig. 9 is a plan view of certain parts of means employed for assembling the cell, and showing elements of said cell in a primary stage of the assemblage.

Fig. 10 is a vertical section of the assembling means, showing the relative position of the anodes and cathode in a further stage of the assemblage.

Fig. 11 is a plan view showing a further stage.

Fig. 12 is a section on line 12—12 of Fig. 10.

Fig. 13 illustrates still a further stage in the assembling of the cell, and Fig. 14 is a fragmentary view in direction of arrow Fig. 13, but showing the winding element eliminated, and Fig. 15 is a perspective view of a container and superimposed members that will be identified in the description.

Figure 16:
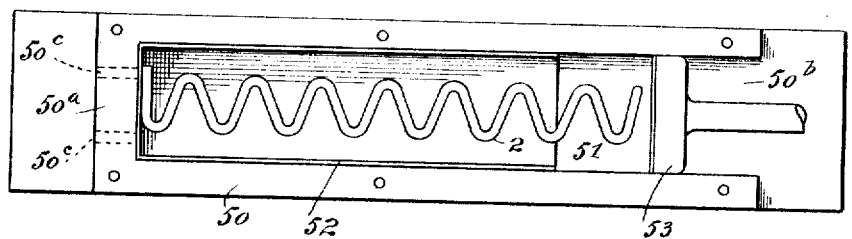
Fig. 16 is a plan view of a modified mold which may be used in assembling the battery.
Figure 17:
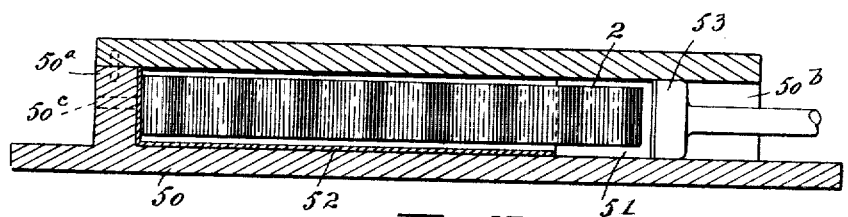
Fig. 17 is a longitudinal section of said mold.

To avoid confusion, the battery mix is not shown in Figs. 9, 10, 11, 12, 16 and 17, however it is illustrated in several other figures, and its relation to the other elements in the several stages of the assemblage will be fully set forth in the explanation of the method.

Referring now particularly to Figs. 1 to 8 inclusive, the present embodiment of the improved dry-cell includes a flat carbon element or cathode 1, with duplicate anodes 2 arranged on opposite sides thereof, but not in contact therewith. The anodes 2 are of sinuous formation, substantially as shown, and comprise a zinc ribbon $2^a$ entirely enveloped in absorbent material $2^b$, and provided with a binding post $2^c$. A suitable depolarizing mixture 3, preferably containing carbon and manganese dioxid, is packed within the container 4, around the cathode 1 and around and between the leaves of the anodes 2. Connection means are provided on the cathode, a preferred construction consisting of a binding post $1^a$ having an extension $1^b$ embedded in the carbon, as shown in Fig. 6. In Fig. 7 a cathode is shown with an aperture $1^c$ adapted to accommodate a connecting member.

The arrangement of the anodes 2 relative to the cathode 1 is best shown in Fig. 8, reference to which will disclose the fact that the opposing sides of the carbon 1 face the inner edges of the sinuous anodes 2, and the flat surfaces of the leaves of said anodes lie in lateral planes relative to said opposing faces. The sinuous formation of the members 2 provides a large area of active element, in proportion to the size of the cell. This is the primary feature of the invention. In my former invention referred to in the foregoing, I employ a sinuous anode with the same primary motive in view, but I have found that the present construction, which also embodies sinuous anodes differently constructed, and arranged relative to the other elements, enhances the efficiency of the cell, provides against the liability to short-circuit, protects the metallic terminals or binding posts of the anodes from contact with the mixture, and retains them in fixed position, and increases the life of the cell. The improved cell can also be manufactured more economically and with increased assurance of perfection. These features will be apparent from the following description of the method of making the cell. This description will also disclose other elements that enter into the preferred construction.

The method of assembling the improved cell is an important factor, and will now be described, referring first to Figs. 9 to 15 inclusive. In this method a mold is used. The said mold comprises a base member 5 of rectangular channel formation, two extension side members 6, and a cover member 7. The side members 6 are provided with dowels $6^a$ adapted to seat in holes $5^a$ and register the side members 6 in perpendicular alinement with the sides of the channel 5. The longitudinal dimensions of the members 5, 6 and 7 are considerably greater than the length of the finished cell, and when they are assembled as shown in Fig. 12, they form a rectangular mold open at both ends. Rectangular movable closure blocks 8 and 9 are provided. These blocks completely fit the contour of the opening in the mold. Rams 10, operated by suitable means, not shown, have a thrust bearing on the blocks 8 and 9.

The operation of constructing the cell is as follows: The members 6 and 7 are removed from the member 5. The blocks 8 and 9 are next spaced so as to provide a chamber 11 of greater longitudinal dimension than the length of the finished cell, as shown in Figs. 9 and 10. An end lining member 12 of the same contour as the opening in the mold is arranged on the interior face of the block 9. Next a thin layer of battery mix is sifted into the chamber 11, and one of the anodes 2, elongated as shown in Figs. 5 and 9, and first having the envelop member $2^b$ saturated with suitable electrolyte, is placed edgewise on the battery mix. The chamber 11 is then completely filled with battery mix, and struck off level with the top of the member 5. Next the carbon member 1 is laid in proper position on top of the mix. The side members 6 are next attached to the member 5 by the dowels $6^a$. A thin layer of mix is then sifted into the extended mold structure on top of the carbon 1. A second anode 2, with its envelop saturated like the first, is then laid on this layer of mix, and the extended chamber $11^a$ is filled with like mix, which is afterward struck off level with the top of the members 6. The cover member 7 is next placed in position as shown in Figs. 10 and 12 the dowels $7^a$ entering holes in the members 6.

Suitable means, not shown, may be employed for clamping the members 5, 6 and 7 firmly together. When the mold has been thus filled and closed, the blocks 8 and 9 are forced inward a predetermined distance by the rams 10, as shown in Fig. 11. This compresses the sinuous anodes 2 and packs the mix in the chamber of the mold around the cathode 1 and the anodes 2, forming a concrete mass of depolarizing mixture with the said cathode and anodes embedded therein, the terminals of the anodes to which the binding posts are attached being exposed to the face of the block 8. Apertures 13 and $13^a$ are provided in the block 8 to accommodate the binding posts $1^a$ and $2^c$. A recess $13^b$ is also provided in block 8 to receive the head of the cathode 1. When the mass has been compressed to the predetermined desired dimensions, as indicated in Fig. 11, it is removed from the mold and inserted longitudinally, with the lining member 12 at its end, into a rectangular container 4. The said container 4 is open at both ends and is made of thin tough material, preferably paper soaked in paraffin. Strips 15 of wood or other suitable material are clamped on two opposing sides of the container 4, by suitable spring clamps 16. Sealing wax or other suitable water-proof material $18^a$ is filled in the end of the container in contact with the terminals of the anodes thereby protecting the binding posts $2^c$ from contact with the mix 3.

One of the members 15 is provided at each end with a notch $15^a$. These notches serve as anchorages for the ends of strong, light twine or tape 17, preferably hemp. The next stage in the method of construction consists in winding the twine or tape tightly around the cell, and in opposite direction from each end thereof, the ends of said twine or tape being tied near the middle as shown at $17^a$ Fig. 13. After the winding process, the clamps 16 are removed and the ends of the cell are sealed with suitable water-tight sealing means 18, and a finishing jacket 19 is provided on the four sides of the cell. The binding posts $1^a$ and $2^c$ are exposed as shown in Fig. 1, and the two posts $2^c$ may be connected if desired for double capacity. Or either one of the anodes may be utilized independent of the other. It will be noted that this construction provides a twin cell with a single cathode.

The winding may be accomplished in any well known manner, or it may be done by means of a certain special device which may be made the subject of a separate patent.

Figure 18:
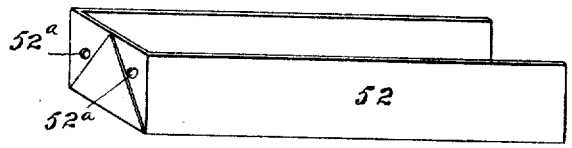
Fig. 18 is a perspective of a carton used in the modification.

Figs. 16 to 19 inclusive, illustrate a slightly modified method of assembling the cell, wherein the compressing force is applied at one end of the mold only. In this method the concrete mass that enters into the cell is made in two halves, a mold member 50 being employed. The member 50 has a chamber 51 therein, closed at one end by member $50^a$ and open at the opposite end as shown at $50^b$. A carton 52 open at the top and at one end as shown in Fig. 18, is laid in the mold, and battery mix with the anode 2 embedded therein is compressed into a concrete mass by the ram 53, the binding post $2^c$ protruding through an aperture $52^a$ in the closed end, an opening $50^c$ being provided in the mold to accommodate said post. I prefer to make the cakes thus formed, in rights and lefts, relative to the binding posts, and for this reason two openings $50^c$ are provided in the member $50^a$, as shown in Fig. 16. Corresponding apertures $52^a$ are formed in the cartons 52.

Figure 19:
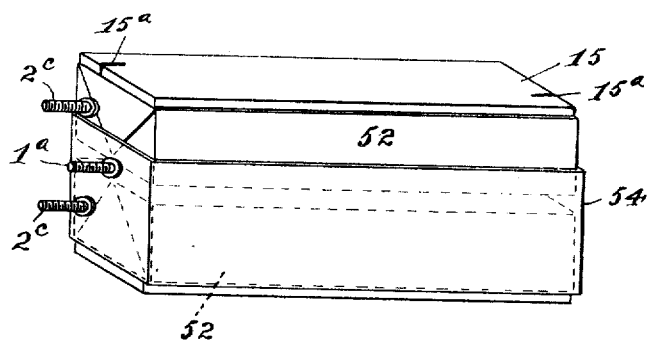
Fig. 19 is a perspective view showing one of the stages of the assemblage.

The next stage of the method provides a casing 54. The said casing is open at the top and is adapted to receive companion cakes of the concrete mass confined in the cartons 52, the said cartons fitting snugly in said casing, laterally and longitudinally. One of the cakes is first inserted in the casing with the mass exposed and the binding post $2^c$ protruding through one end of said casing. The cathode member is then laid on the exposed surface, with its binding post $1^a$ protruding. Battery mix is then pressed around the cathode, and a companion cake 52 inserted in the casing, with its exposed surface downward, or in contact with the cathode as shown in Fig. 19. The strips 15 are then clamped to the two opposing sides, as shown, and the structure is suitably compressed as hereinbefore described.

While the method described provides for the application of longitudinal force for compressing the mass, it will be understood that the molds may be modified so as to admit of the application of the force laterally, without departing from the spirit of the invention.

What I claim and desire to secure by Letters Patent is.

1. A battery of the character described comprising a container, a cathode, twin anodes of sinuous formation arranged on opposite sides of the cathode, and depolarizing mixture packed in said container with the cathode and twin anodes in a concrete mass.

2. A battery of the character described comprising a closed container, duplicate anodes consisting of strips of active material sinuous in formation thereby forming two continuous series of opposing members, envelops of absorbent material surrounding said sinuous strips, an electrode interposed between said anodes, and depolarizing mixture packed in said container around the electrode and around the anodes.

3. A battery of the character described comprising a closed container, duplicate anodes consisting of series of connecting leaves of active material enveloped in absorbent material, an electrode interposed between said anodes, the edges of the anodes facing the electrode the leaves of said anodes being in transverse planes relative to the electrode, and depolarizing mixture packed in said container around and in contact with the electrode and the anodes.

4. A battery of the character set forth comprising a closed container, duplicate anodes consisting of ribbons of active material sinuous in formation thereby forming two continuous series of opposing surfaces, envelops of absorbent material surrounding and in contact with the sinuous ribbons, an electrode interposed between said anodes, edges of the anodes facing the electrode and the opposing surfaces of the sinuous formation extending in transverse planes relative to the electrode, and depolarizing mixture packed in said container around and in contact with the electrode and the anodes.

5. In dry-cell battery construction the combination of a container; a cathode within said container; duplicate anodes arranged on opposite sides of the cathode, said anodes comprising flexible sinuous ribbons of active material enveloped in absorbent material; depolarizing mixture surrounding the cathode and anodes, the anodes being compressed and the mixture packed into a concrete mass within the container; closure members for the ends of the container; terminal binding posts attached to the cathode and the anodes, said posts protruding through one of the closure members; and means for protecting the terminals of the anodes from contact with the mixture.

6. The method of making a battery that includes twin anodes of sinuous formation and an interposed cathode embedded in a concrete mass of battery mix confined in a container, said method consisting of, first providing a channel mold, the longitudinal dimension of which is greater than the length of the battery, next forming in said mold twin concrete masses of depolarizing mixture with the sinuous anodes compressed therein and having their terminals protected from the mixture, next inserting the twin masses with an interposed cathode packed in battery mix, into a flexible jacket, next placing reinforcing members on the sides of the jacket, then compressing and binding the structure with suitable binding material, and finally hermetically sealing the cell.

In testimony whereof I affix my signature.

HERBERT R. PALMER.